(12) United States Patent  (10) Patent No.: US 9,272,498 B2
Colgan et al.  (45) Date of Patent: Mar. 1, 2016

(54) PRECAST THERMAL INTERFACE ADHESIVE FOR EASY AND REPEATED, SEPARATION AND REMATING

(75) Inventors: Evan George Colgan, Chestnut Ridge, NY (US); Paul W. Coteus, Yorktown Heights, NY (US); Michael Anthony Gaynes, Vestal, NY (US); Kenneth Charles Marston, Poughquag, NY (US); Steven P. Ostrander, Poughkeepsie, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 88 days.

(21) Appl. No.: 13/546,151

(22) Filed: Jul. 11, 2012

(65) Prior Publication Data

US 2012/0276375 A1  Nov. 1, 2012

Related U.S. Application Data

(62) Division of application No. 12/684,174, filed on Jan. 8, 2010, now Pat. No. 8,268,389.

(51) Int. Cl.
*B32B 15/08* (2006.01)
*B32B 37/12* (2006.01)
*B32B 37/26* (2006.01)
*B32B 37/24* (2006.01)

(52) U.S. Cl.
CPC ............. *B32B 37/1207* (2013.01); *B32B 37/26* (2013.01); *B32B 2037/243* (2013.01); *B32B 2037/268* (2013.01); *B32B 2309/02* (2013.01); *B32B 2311/12* (2013.01); *B32B 2311/24* (2013.01); *B32B 2457/08* (2013.01); *Y10T 156/11* (2015.01); *Y10T 156/1195* (2015.01); *Y10T 428/2804* (2015.01); *Y10T 428/2813* (2015.01); *Y10T 428/2861* (2015.01)

(58) Field of Classification Search
CPC    B32B 37/26; B32B 2037/268; Y10T 156/11; Y10T 428/2861; Y10T 428/2804
USPC ................................. 427/207.1, 208.2, 208.6
See application file for complete search history.

(56) References Cited

U.S. PATENT DOCUMENTS

| | | | |
|---|---|---|---|
| 4,962,416 A * | 10/1990 | Jones et al. | .................... 257/722 |
| 6,090,484 A * | 7/2000 | Bergerson | ............... 428/355 EN |
| 6,183,839 B1 | 2/2001 | Bourrieres | |
| 6,214,460 B1 | 4/2001 | Bluem et al. | |
| 7,846,778 B2 | 12/2010 | Rumer et al. | |
| 2007/0131912 A1* | 6/2007 | Simone et al. | ................ 252/500 |
| 2007/0145574 A1* | 6/2007 | Colbert et al. | ................ 257/721 |
| 2009/0111925 A1 | 4/2009 | Burnham et al. | |

* cited by examiner

*Primary Examiner* — Xiao Zhao
(74) *Attorney, Agent, or Firm* — Scully, Scott, Murphy & Presser, P.C.

(57) ABSTRACT

Precast curable thermal interface adhesives facilitating the easy and repeatable separation and remating of electronic components at thermal interfaces thereof, and a method for implementing the foregoing repeatable separation and remating at the thermal interfaces of components through the use of such adhesives.

13 Claims, 4 Drawing Sheets

PRECAST THERMAL INTERFACE ADHESIVE FOR EASY AND REPEATED, SEPARATION AND REMATING

RELATED APPLICATIONS

This application is a divisional of U.S. application Ser. No. 12/684,174, filed Jan. 8, 2010.

BACKGROUND OF THE INVENTION

The present invention relates to the provision of precast curable thermal interface adhesives facilitating the easy and repeatable separation and remating of electronic components at thermal interfaces thereof. More particularly, the invention relates to a novel method for implementing the foregoing repeatable separation and remating at the thermal interfaces of components through the use of such adhesives.

Microelectronic chip packages that are complex in nature are expensive to produce, and are made to be readily taken apart to enable the repair, replacement, upgrading or swapping of the components thereof. These packages generally incorporate elaborate cooling hardware components that may possess more than one thermal interface, whereby an essential attribute of these thermal interfaces resides in affording an easy separation between the components.

Basically, employed for this purpose are thermal interface materials (TIMs) that are inherently imbued with a low degree of adhesion, such as diverse kinds of greases, gels, pads or films. While these TIM materials enable implementing separation at thermal interfaces, they also are subject to several drawbacks, in that these materials, for the main, are designed for single or one time use, and therefore require removal of any old or residual material, cleaning of the applicable surfaces on the components and the application of new joining or TIM materials.

In essence, the cleaning of the thermal interface sites of separated components follows a prescribed procedure, and typically involves the use of a clean cloth and solvent. Normally, the utilized cleaning method is implemented manually and, thus, controlled to a lesser degree than the manufacturing process employed for initially applying the TIM to the components. Another limitation resides in that pads and any film being applied allow for air to be entrapped at both interface surfaces at the sites because of their flat profiles, potentially resulting in increased thermal resistance.

In view of the foregoing, it would accordingly be advantageous to be able to provide a TIM which minimizes any thermal resistance, and facilitates an easy separation and repeatable remating of components without degrading the material or the thermal performance at the interface site or sites. The use of curable TIMs is ordinarily considered undesirable because of the need for an undue expenditure of time and for the necessity of controlling a precise curing temperature. Furthermore, both solvents and curable adhesives are constituted of possibly toxic or volatile chemicals that require the following and enforcement of proper or stringent safety protocols.

THE PRIOR ART

With respect to the foregoing, Bluem, et al., U.S. Pat. No. 6,214,460 B1 discloses an adhesive composition and method of utilization thereof that is employed for screen-printable applications. Although this provides for a curable adhesive composition, there is no disclosure of utilizing the foregoing or any thermal interface material with regard to essentially effectuating an easy, repeatable separation and remating of electronic components at thermal interfaces which facilitates the ready reuse thereof.

Furthermore, Bourrieres, U.S. Pat. No. 6,183,839 discloses a stencil for depositing and portioning thick spot layers of a viscous material and a method of application. However, similar to Bluem, et al., this publication also fails to provide for a method and TIM material, whereby a precast thermal interface adhesive can be employed with an easy and repeatable remating of thermal interfaces in electronic package and cooling components.

SUMMARY OF THE INVENTION

Pursuant to the present invention, a method has been developed and demonstrated of being capable to precast a curable TIM adhesive onto a desired surface, such as a thermal interface site, to a specified target bondline thickness. In this connection, the TIM adhesive is applied to a heat spreader or heat sink surface, where upon the heat spreader or heat sink is then mated with a dummy substrate that is optionally coated with a release layer. Mating between these components at thermal interface sites is controllably implemented so as to achieve a target bondline, whereby such target bondlines can be obtained by using external spacers, such as wires or particles, by incorporating particles into the adhesive formulation, or over a period of time and application of force during mating of the parts.

Subsequently, the mated parts are cured, and after completion of the curing and cooling of the mated parts; i.e., heat sink surface and dummy substrate, the substrate together with any release layer thereon is either peeled or sheared away from the heat spreader or heatsink. The TIM adhesive adheres strongly and permanently fixed to the heat spreader or sink surface to which it was previously applied and represents a second free surface which can then be interfaced with a second heat sinking surface. This second interface site can be again easily separated and remated several times without damaging the TIM in the absence of any solvent cleaning or mechanical wiping of the surface.

BRIEF DESCRIPTION OF THE DRAWINGS

Reference may now be made to the following description in conjunction with the accompanying drawings; in which.

DETAILED DESCRIPTION

Figure 1:
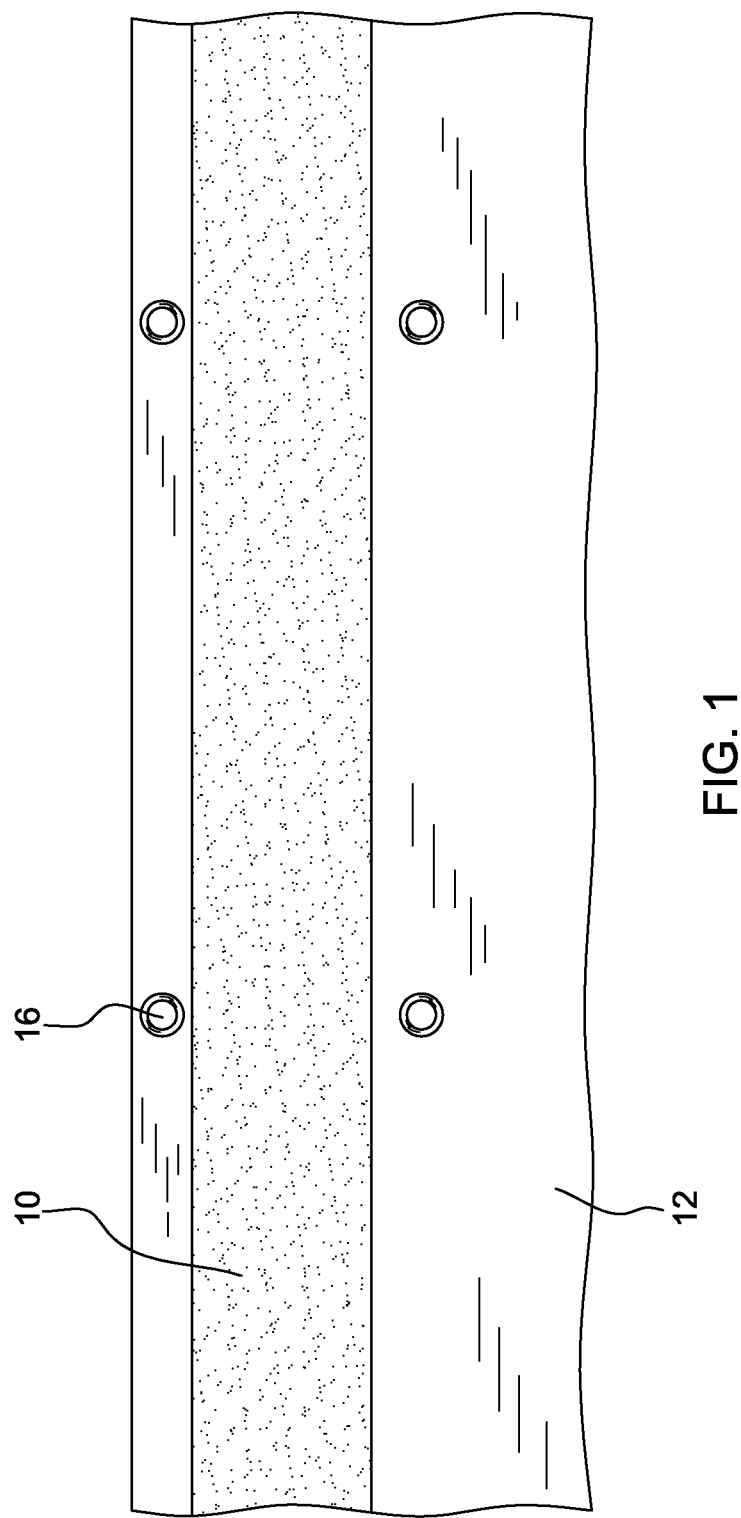
FIG. 1 is a photographic representation of a cast and cured thermal interface adhesive material (TIM) deposited on a curvilinear aluminum heat sink component.
Figure 3:
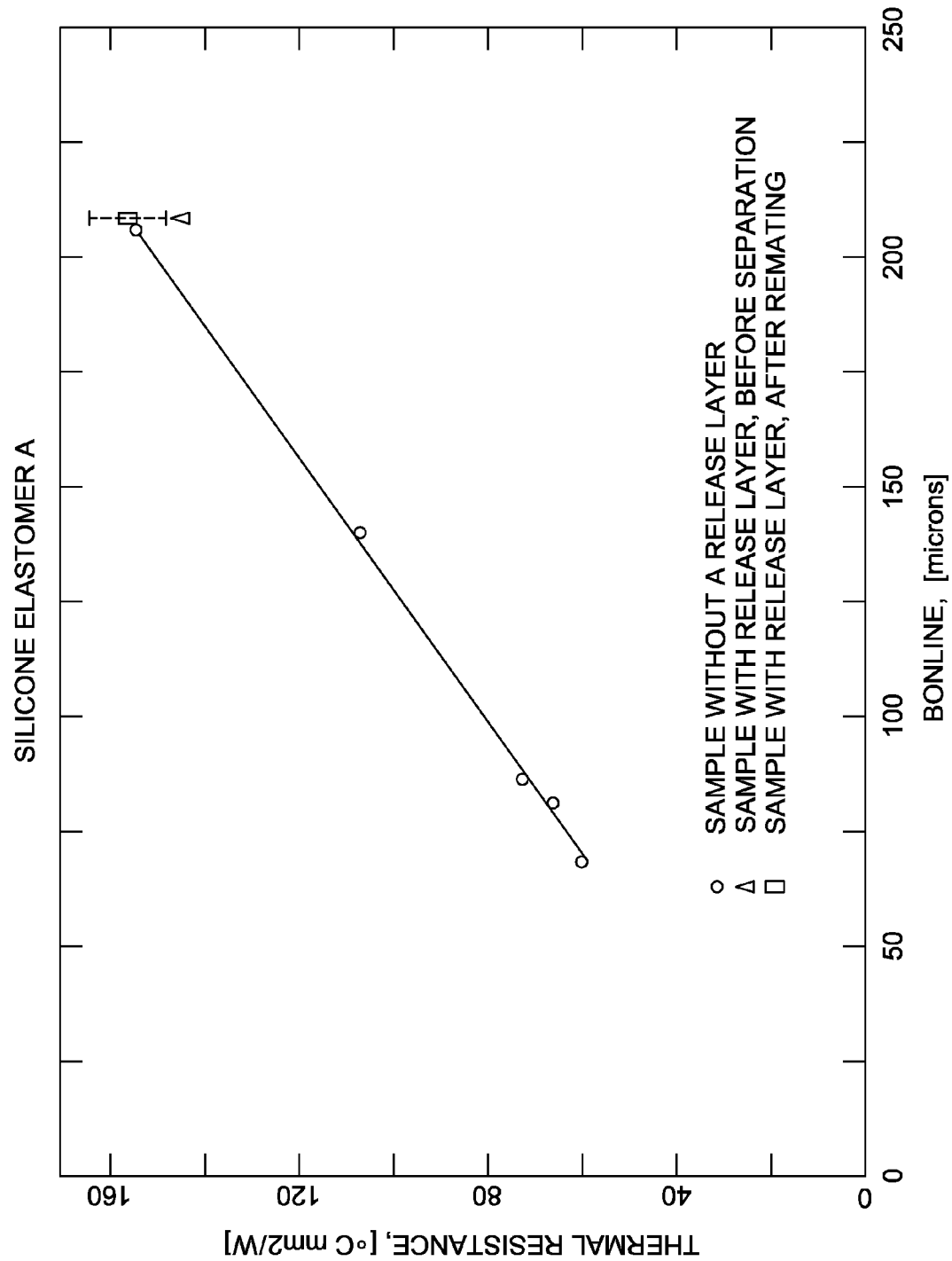
FIG. 3 illustrates a graphic representation of the measurements for the thermal resistance of a first thermal interface material (TIM) comparing samples made without a release layer to a sample made with a release layer and measured before separation and after remating.

Referring specifically in greater detail to the invention, a release layer is pre-applied to a dummy substrate by using a sprayed-on polytetrafluoroethylene (Teflon™) coating such as Miller Stephenson MS 122 AX (as shown in the graph of FIG. 3). Baking at 310° C. for several minutes is normally sufficient for melting the mobile Teflon™ particles, and resultingly fix a permanent, uniformly, thin film onto the dummy substrate. The dummy substrate is ideally a sheet of a flat, flexible metal, such as 0.010 in. thick or less stainless steel or even more flexible, 0.010 inch thick or less polyimide. In the case of using flexible metal sheets as the dummy substrate, other means of applying a low surface energy coating can be used, such as chemically bonding a coating of only a monolayer to a few monolayers thick. For example, octadecytrimethoxy silane or octadecytrichlorosilane can be applied at a monolayer scale to mineral oxide surfaces. Low surface energy metal finishes such as nickel plating with brighteners or titanium nitride could also be used on either a flexible metal or flexible polymer dummy substrate. If the surface of the actual heat sink (not shown) is not planar, i.e., having contours, curves or curvilinear portions, a dummy substrate should be used that theoretically represents the actual surface with which the heat sink conformingly mates or attaches thereto. A TIM (thermal interface material) adhesive of choice, such as a silicone elastomer 10 is dispensed onto a heat sink surface 12 that is generally used to provide the cooling solution for a complex microelectronic package. The heat sink device 12 is mated to the dummy substrate that has the pre-applied release film or coating of Teflon™ formed or deposited thereon. As shown in FIG. 1, the foregoing is applicable to a curvilinear aluminum heat sink part in lieu of using the exemplary dummy substrate.

Figure 2:
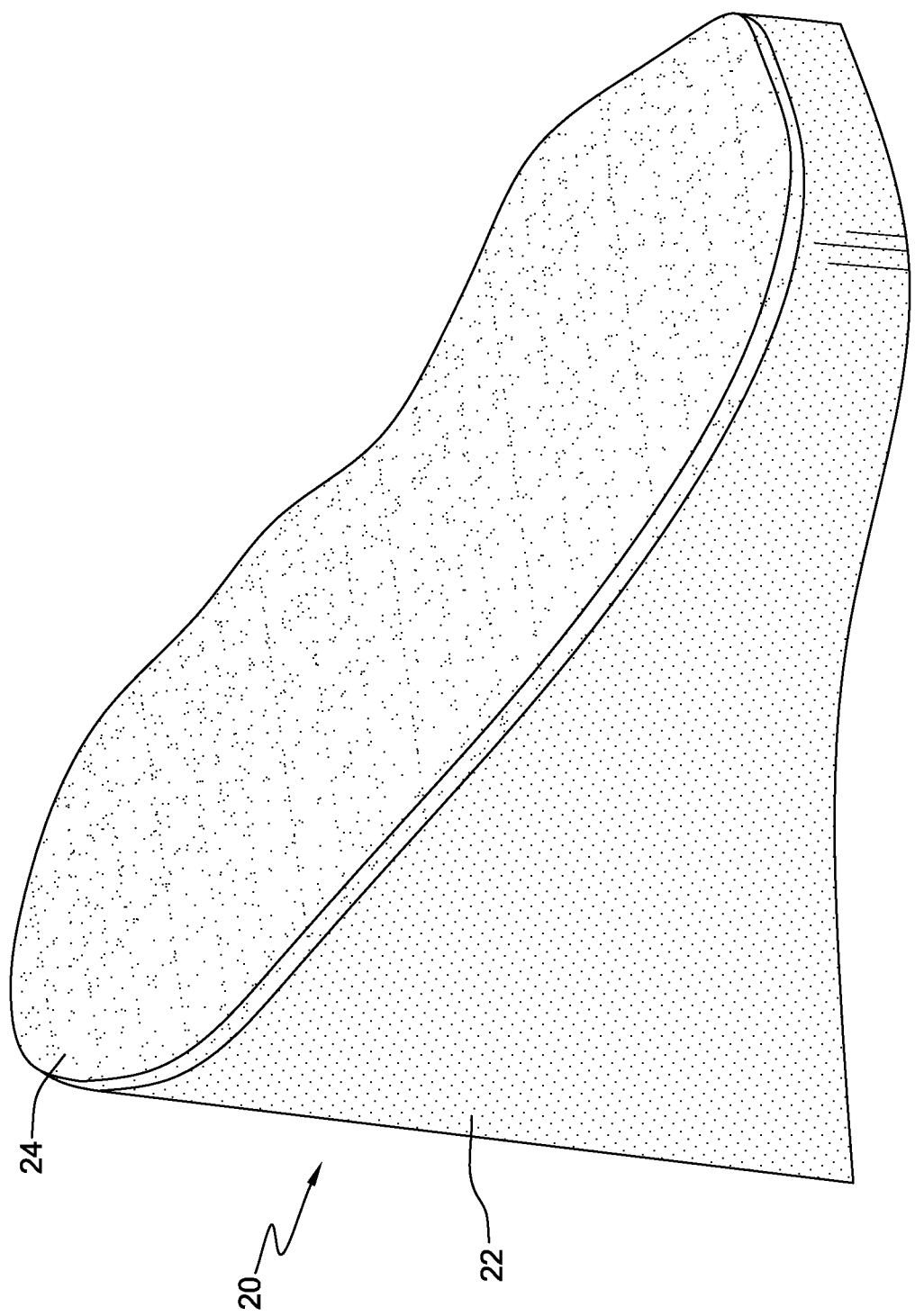
FIG. 2 is a photographic representation of a cast and cured thermal interface adhesive material which has been cast and cured on a small, flat heat sink surface.

Similarly, as represented in FIG. 2, this shows a typical small flat heat sink surface 20 defining the interface area of a commercial heat sink. Two types of TIM adhesives 22, 24 are shown as having been cast and cured on the surface 20, by way of example. Both adhesives 22, 24 are essentially silicone elastomers, although possibly of slightly different formulations.

Any required target bondlines to attain the foregoing can be achieved by means of several methods. Thus, the dummy substrate could be equipped with line or dot protuberances at a height that matches the target bondline. Spacer particles 16 could also could be settled onto the dummy substrate surface in lieu of the foregoing, or alternatively these particles 16 could be incorporated directly into the adhesive, which in itself is a silicone elastomer formulation. Easiest and what is most typically practiced in manufacturing, is the use of specified mating pressure or force and processing time.

An additional benefit of curing against a dummy substrate is that the cured surface of the thermal adhesive can be matched in roughness to the surface to which it will ultimately be mated. In contrast, stencil or screen printing the thermal adhesive on a flat, non-curvilinear surface would typically result in a non uniform surface topography that could allow more air entrapment to occur during mating of heat sink to component.

Hereby, the mated parts are cured, whereby subsequent to cooling, the basically flexible metal or polymer substrate can be bent away from the heat sink part, initiating release from each other at a thermal interface site. If a rigid dummy substrate is used because of the presence of non planar or contoured surfaces on the heat sink, such as is encountered, for example, with a structure having the shape of a copper pipe used to carry a cooling liquid, then applying a twisting, torquing or shearing action will readily effect release between the mated parts.

Concerning the foregoing, applicants note that the present invention is clearly and desirably applicable to curvilinear components, as illustrated by way of example in FIG. 1 of the drawings.

Operative Examples

A curvilinear aluminum heat sink matingly accepts a cylindrical copper tube that conveys a flow of cooling fluid, wherein it is intended to apply a curable TIM adhesive to the curvilinear heat sink surface. A dummy copper tube is prepared with a Teflon™ release coating layer, by spray applying polytetrafluoroethylene (Teflon™) sold by Miller Stephenson as MS 122 AX. The coating is baked at 310° C. for at least 5 minutes, and is then cooled. Thereafter, TIM adhesive is dispensed on the curvilinear aluminum heat sink surface using dispensing patterns, such as lines, to prevent any air entrapment during mating. The dummy copper tube with a baked-on Teflon™ release layer is mated to the curvilinear aluminum surface and fixed in place in the same manner as it would be in the actual functional assembly (such as with mechanical fasteners). After curing and cooling of the TIM adhesive, the mechanical fasteners that mate the copper tube with the heat sink aluminum surface are removed. Mild twisting by hand is then employed in order to separate the copper tube from the aluminum surface at the thermal interface site.

(2) Aluminum rods that are 0.5 inches in diameter were used to measure the thermal resistance of TIMs. Rod samples were prepared wherein one rod surface was prepared with a Teflon™ release coating whereas a second rod surface remained uncoated. After cure of the TIM, the thermal resistance thereof was measured, respectively at 0 and 75 psi. Thereafter, the rods were easily separated at the rod end having the Teflon™ coating and remated under 75 psi, representing actual operative or utilization conditions. There was an increase of 3% in thermal resistance which is within the repeat noise of the measurement; and as illustrated in the graphical plot of FIG. 3.

Other data points in this plot are samples that were made without any Teflon™ release layer. It is noted that the one sample that was prepared with a Teflon™ coating (FIG. 3) is a close match with the performance curve of FIG. 3 in which no Teflon™ coating was used.

Figure 4:
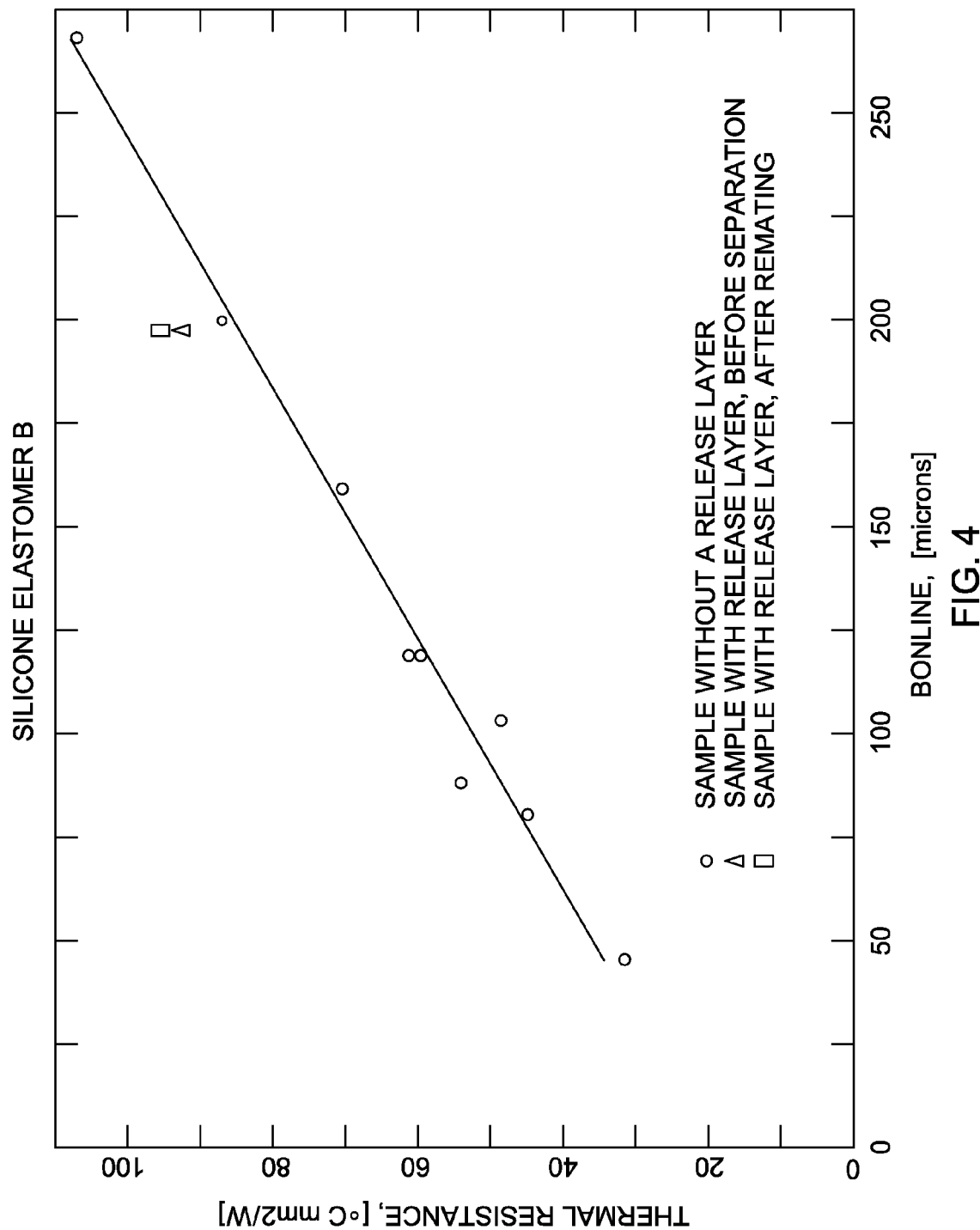
FIG. 4 illustrates a graphic representation of the measurement of a second TIM comparing samples made without a release layer to a sample made with a release layer and measured before separation and after remating.

A second TIM was measured with the aluminum rods using a Teflon™ release coating on one rod (FIG. 4) and compared with several samples that were made without any release layer (FIG. 4). Again, the TIM sample that was precast and released from a Teflon™-coated surface produced results similar to samples that were adhesively bonded at both aluminum rod ends, but in the absence of any Teflon™ film or coating.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but to fall within the spirit and scope of the appended claims.

What is claimed is:

1. An assembly for forming a re-attachable, precast curable thermal interface adhesive layer of a specified shape and specified thickness, the assembly comprising:
   a curable thermal interface adhesive layer applied onto a first heat sink;
   a dummy substrate including an outer surface that represents a surface of a second heat sink; said curable thermal interface adhesive layer and the first heat sink being applied onto the outer surface of the dummy substrate, and said outer surface forming the thermal interface adhesive layer into said specified shape matching a shape of the outer surface of the second heat sink and with said specified thickness as said adhesive layer cures; and a release layer releasably applied onto the outer surface of the dummy substrate prior to said thermal interface adhesive layer being applied thereto, and located between the outer surface of the dummy substrate and the thermal interface adhesive layer to facilitate separating the thermal interface adhesive from the dummy substrate with the first heat sink fixed to the thermal interface adhesive layer, thereby enabling said thermal interface adhesive layer, with the first heat sink fixed thereto, to be mated with said second heat sink.

2. The assembly of claim 1, wherein the release layer is constituted essentially of polytetrafluoroethylene an elevated temperature being imparted to said release layer for melting said release layer so as to form a fixed permanent film onto said substrate surface, and said dummy substrate and heat sink defining surface being metal by superimposing said molten release layer on said cured thermal interface adhesive layer.

3. The assembly of claim 2, wherein said dummy substrate comprises a metal sheet, and said release layer is baked on the surface of said substrate at a temperature of about 310° C. to form said film coating thereon.

4. The assembly of claim 3, wherein said dummy substrate comprises a high temperature polymer sheet, and said release layer is baked on the surface of said substrate at a temperature of about 310° C. to form said film coating thereon.

5. The assembly of claim 1, wherein mating between the dummy substrate and the thermal interface adhesive is implemented to achieve target bondlines, said target bondlines comprise spacer particles that are incorporated into a formulation for the thermal interface adhesive.

6. The assembly of claim 1, wherein said thermal interface adhesive is essentially constituted of a silicone elastomer, acrylic or urethane elastomer.

7. The assembly of claim 1, wherein mating between the dummy substrate and the thermal interface adhesive is implemented to achieve target bondlines, and protuberances are formed on the outer surface of said dummy substrate, said protuberance being of a height that matches the target bondlines.

8. The assembly of claim 7, wherein said protuberances comprises spacer particles located on the surface of said dummy substrate.

9. The assembly of claim 8, wherein said heat sink representing surface having said thermal interface adhesive coating has curvilinear surface portions, said dummy substrate being flexible so as to facilitate mating with said curvilinear surface portions and enable the separation between said dummy substrate and said heat sink defining surface.

10. The assembly of claim 1, wherein said heat sink representing surface is constituted of metal.

11. The assembly of claim 10, wherein said metal comprises aluminum or copper.

12. The assembly according to claim 1, wherein:
the thermal interface adhesive layer is permanently bonded to said first heat sink;
the first heat sink is mated with the dummy substrate, with the thermal adhesive layer held between the first heat sink and the dummy substrate; and
the mating of the first heat sink and the dummy substrate is controlled to form the thermal adhesive layer into said specified shape and said specified thickness.

13. The assembly according to claim 12, further comprising:
mechanical fasteners mating the first heat sink and the dummy substrate; and wherein:
as the thermal interface adhesive cures against the dummy substrate, a cured surface of the thermal interface adhesive is matched in roughness to a surface of the second heat sink; and
after the thermal interface is cured, the mechanical fasteners that mate the first heat sink and the dummy substrate are removed, and twisting is employed to separate the first heat sink from the dummy substrate at a site of the thermal interface adhesive.

\* \* \* \* \*